United States Patent [19]
Schnegg et al.

[11] Patent Number: 6,023,925
[45] Date of Patent: Feb. 15, 2000

[54] PRODUCTION OF COLOR BLENDED YARN

[75] Inventors: Julius R. Schnegg, Burlington; Charles F. Bino, Greensboro, both of N.C.

[73] Assignee: Burlington Industries, Inc., Greensboro, N.C.

[21] Appl. No.: 08/975,697

[22] Filed: Nov. 21, 1997

[51] Int. Cl.[7] .................................................. D01H 4/00
[52] U.S. Cl. ...................... 57/1 R; 57/2; 57/75; 19/65 A; 19/145.5
[58] Field of Search ................................... 19/107, 145.5, 19/145.7, 65 A; 57/252, 2, 1 R, 75, 262

[56] References Cited

U.S. PATENT DOCUMENTS

| | | | |
|---|---|---|---|
| 1,552,148 | 2/1925 | Kerwin | 19/145.7 |
| 3,251,097 | 5/1966 | Faw et al. | 57/2 |
| 5,331,801 | 7/1994 | Heifetz | 57/252 |
| 5,481,864 | 1/1996 | Wright | 57/252 |
| 5,752,295 | 5/1998 | Musha et al. | 19/145.5 |

OTHER PUBLICATIONS

The Economics, Science and Technology of Yarn Production by Peter Lord, Abel C. Lineberger Professor of Textiles; School of Textiles NC State; 1981.
Burlone, "Formulation of Blends of Precolored Nylon Fiber," COLOR research and application, pp. 114–120; summer 1983.
Burlone, "Theoretical and Practical Aspects of Selected Fiber–Blend Color–Fomulation Functions," COLOR research and application, pp. 213–219; vol. 9, No. 4, Winter 1984.
Burlone, "Effect of Fiber Translucency on the Color of Blends of Precolored Fibers", Textile Research Journal, pp. 162–167, Mar. 1990.
Amirshahi et al, "Applying the Kubelka–Munk Equation to Explain the Color of Blends Prepared from Precolored Fibers," Textile Research Journal, pp. 357–364, Jun., 1994.
Amirshai et al, "An Algorithm for Optmizing Color Prediction in Blends", Textile Research Journal, pp. 632–637; Nov., 1995.
Johnson, "Regal Develops New Rug Yarn," HFN, p. 23, Mar. 18, 1996.
Sager, "The Yarn Story", Modern Knitting Management, p. 59, May/Jun. 1981.

*Primary Examiner*—William Stryjewski
*Attorney, Agent, or Firm*—Nixon & Vanderhye P.C.

[57] ABSTRACT

A colored yarn is made in an inexpensive manner that allows a wide variety of different colors or hues within the product line, and also allows a wide variety of different effects to be produced including yarns with minimal leather effect, or yarns with a distinct and desired heather effect. A first coarse feeder yarn, e.g. a 1/1 semi worsted yarn, is ring or open end spun with about 2.5 turns per inch. The coarse feeder yarn is dyed, dried, and then cut and opened up into individual fibers about four inches long or less (preferably two inches long or less). The individual fibers are blended with differently colored or hued fibers produced in the same way, and/or with greige or colored staple fibers, to produce a blended composite of fibers. The blended composite is then spun, for example ring spun or open end spun, into a final colored yarn. Rayon fibers may especially effectively and uniquely be utilized, although almost any fiber or mix of fibers can be used.

22 Claims, 4 Drawing Sheets

PRODUCTION OF COLOR BLENDED YARN

BACKGROUND AND SUMMARY OF THE INVENTION

Textile makers continuously search for new, different, and appealing products, especially colored yarns (that is yarns having a color aside from white or greige colored). Oftentimes new yarns are made by blending short length (typically about two inches or less, e.g. about 1.25 inches) stock dyed staple fibers (either used alone or blended with greige staple fibers). However, stock dyed short fibers are typically not available in a wide variety of colors. Therefore, while it may be possible to produce a few different colors of new desired yarns, if it is necessary to produce an entire new product line (which requires a wide variety of different colors and/or hues), it is impractical to do so using stock dyed fibers. Customized colors of producer dyed fibers could be used instead of stock dyed fibers, however customized colors of producer dyed fibers are difficult to obtain since fiber producers require that a large quantity of such fibers be ordered (in order to make it economical for the fiber producer).

According to the present invention, the problems discussed above are overcome by a simple and straightforward method, to produce a wide variety of new colored yarns. By practicing the invention it is not only possible to produce entire lines of new (virgin) yarns, with a wide variety of colors and hues in the line, but it is also possible to produce them inexpensively and efficiently and with minimal undesirable heather effect, or alternatively with a distinct and desired heather effect.

According to one aspect of the present invention a method of making a colored yarn is provided, comprising the steps of substantially sequentially: (a) Producing a first virgin coarse feeder yarn. (b) Dyeing the first coarse feeder yarn a first color. (c) Drying the dyed first coarse feeder yarn. (d) Cutting the virgin dried first coarse feeder yarn and opening it up into first individual fibers about four inches long or less (preferably about two inches long or less, e.g. about 1.25 inches). (e) Blending the individual fibers from step (d) with other fibers to produce a blended composite of fibers. And, (f) spinning the composite of fibers into a final colored yarn.

In the past, feeder yarns have been used in the production of "turbo" yarns. However in the construction of turbo yarns the feeder yarns are formed tightly, with either a high degree of twist, or by using a production technique (such as open end spinning) where the fibers interlock significantly, because after cutting the intent has been to keep most of the cut thread intact. In turbo yarns the cut threads show in the yarn as colored nubs or slubs. The invention significantly departs from turbo yarn both in the manner of production and in the purpose, according to the invention the feeder yarns being made so that after cutting they readily open up into individual fibers (also called "cut threads").

Step (a) is typically practiced by spinning a 0.5/1 cc to 4/1 cc yarn (preferably approximately a 1/1 cc yarn, such as a 1/1 cc semi worsted yarn) by ring spinning. Typically step (b) will be practiced by package dyeing (although dyeing on a slasher is also possible) in which case a coarse feeder yarn is used with only as many turns (e.g. between about 1.0 to about 5.0 turns per inch, such as about 2.5 turns per inch) to make the yarn windable on dye springs or the like. Step (a) is typically practiced using staple fibers having a length of about three inches or more (e.g. about five to six inches), although shorter staple fibers could also be used. The invention has particular advantages and can achieve particularly unusual products where rayon is used either as the sole or a significant component of the coarse feeder yarn, but the invention is applicable to a wide variety of different yarn types including a mix of two or more different staple fibers selected from the group consisting essentially of cotton, rayon, polyester, acrylic, nylon, and polypropylene. Step (e) is typically also practiced using at least some greige staple fibers. For some products, step (e) is practiced by blending between about 10–80% (preferably about 20–40%) first individual fibers with greige staple fibers.

The invention may also comprise the further steps of: (a1) producing a second coarse feeder yarn; (b1) dyeing the second coarse feeder yarn a second color; (c1) drying the dyed second coarse feeder yarn; and (d1) cutting the dried second coarse feeder yarn and opening it up into second individual fibers about four inches long or less; and wherein step (e) is practiced by blending the first and second, differently colored, individual fibers together. Steps (a1) through (d1) may be practiced to produce at least third through fifth differently colored individual fibers, and step (e) may be practiced by blending two or more of the at least first through fifth differently colored individual fibers together to produce a multitude of (e.g. at least six, preferably ten or more) differently colored final yarns or a line or group of yarns. Steps (a) through (d) and (a1) through (d1) may be practiced to produce individual fibers having different colors but similar hues; e.g. an orange and a red, or a tan and a brown; steps (a1)–(d1) may be practiced to produce at least third individual fibers having a different color but similar hue to the first and second individual fibers; and steps (e) and (f) may be practiced to blend and spin the different color, similar hue, individual fibers together to produce a final yarn with minimal undesirable heather effect. Alternatively, especially where at least the majority of the staple fibers used in the practice of step (a) are of deep color, steps (e) and (f) may be practiced to produce a final yarn with a distinct and desired heather effect.

A line or group of a multitude of colored yarns (typically at least six, e.g. ten or more) may be provided, each colored yarn produced by practicing the method as set forth above. The yarns within a line each have substantially the same composition (e.g. about 80% cotton, 20% acrylic), differing from each other in color and/or hue only.

It is the primary object of the present invention to provide an effective and simple method of making a colored yarn, particularly to allow manufacture of lines of a wide variety of different colored yarns, and the lines of colored yarn so produced. This and other objects of the invention will become clear from an inspection of the detailed description of the invention and from the appended claims.

DETAILED DESCRIPTION OF THE DRAWINGS

Figure 1:
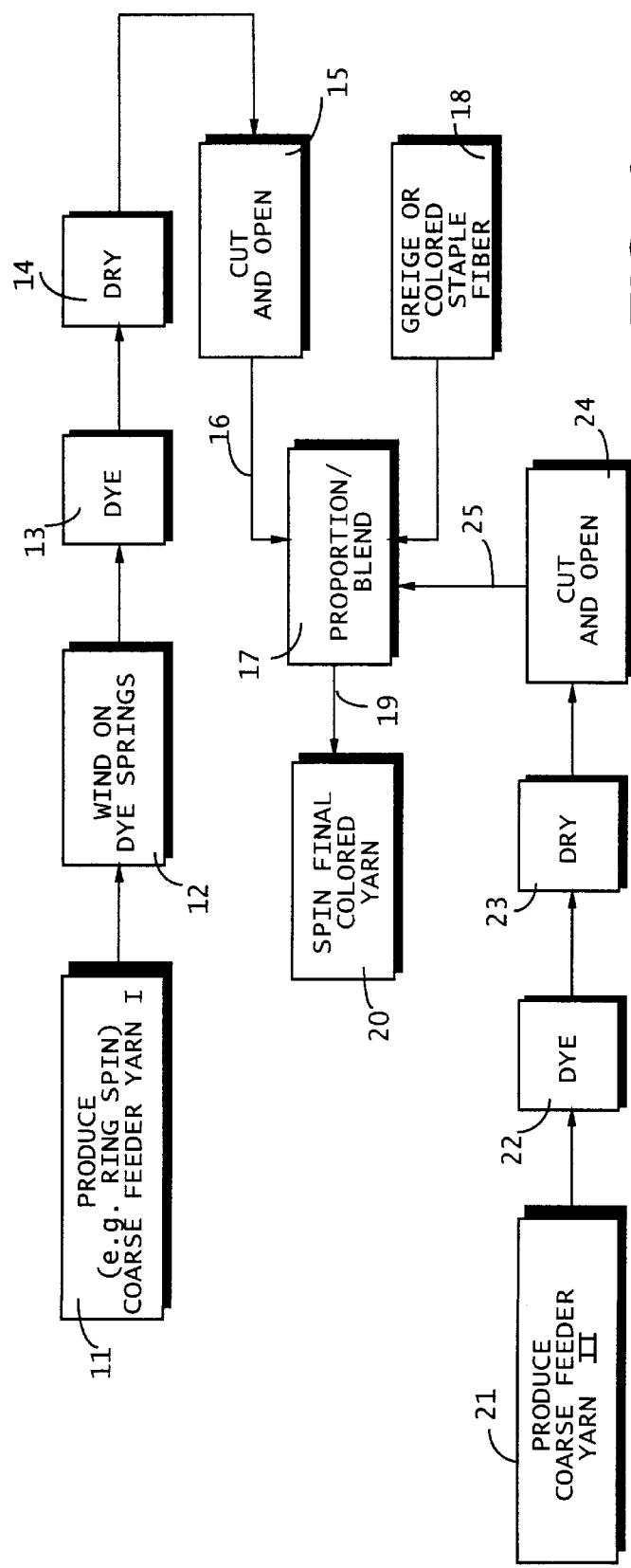
FIG. 1 is a schematic, box diagram indicating exemplary method steps that may be practiced for producing colored yarns according to the present invention.

FIG. 1 schematically illustrates exemplary method steps that may be practiced in the production of colored yarns according to the present invention, particularly for a line of blended yarns, that can be produced more cheaply than by using either producer dyed or stock dyed yarns, such as rayon yarns. According to the present invention a first coarse feeder yarn is produced as indicated generally by reference numeral 11. Step 11 is typically practiced by spinning (such as ring spinning) a 0.5/1 cc to 4/1 cc (e.g. approximately a 1/1, cc such as a 1/1 cc semi worsted) yarn. If the yarn is to be package dyed then it should have only enough turns to make the yarn windable on dye springs or the like, typically about 2–3 turns per inch (e.g. about 2.5 turns per inch). Preferably the staple fibers used in step 11 are long, such as three inches or more (e.g. five to six inches), but if desired short staple fibers may be used instead. Almost any fiber can be used for such purpose, such as cotton, rayon, polyester, acrylic, nylon, and polypropylene, and typically blends of different fibers are used (e.g. 88% cotton, 12% acrylic; 50% cotton, 50% rayon, etc.). More than two different fibers may be used in a blend.

The feeder yarn is wound on dye springs or the like, as indicated at step 12 in FIG. 1, and then is package dyed as indicated at 13 in FIG. 1. The steps 12, 13 are, per se, entirely conventional. Then the dyed yarn is dried as indicated at step 14 in a conventional manner, and then the virgin dyed and dried yarn is cut and opened up as indicated at step 15 of FIG. 1.

Step 15 in FIG. 1 may be practiced by utilizing any conventional yarn cutting equipment, and typically is practiced to cut the dyed, dried first coarse feeder yarn into first individual fibers about four inches long or less, preferably about two inches long or less, such as about 1.25 inches in length. Because the first coarse feeder yarn produced in step 11 has minimum turns, and because it is preferably produced in a technique (such as ring spinning, as opposed to open end spinning) where the fibers are not significantly intertangled, the fibers readily open up merely upon cutting and subsequent conveyance on a conveyor belt, pneumatically, or in other conventional manners. However in situations where the cut yarns do not readily open up, conventional equipment can be used for facilitating opening up of the "cut threads" into individual fibers, such as by fluid blasts, vibration, mechanical action, movement through an air jet or other fluid blow chamber, or the like.

The individual fibers from step 15 are passed—as indicated at 16 in FIG. 1—to a blending station 17 where they are blended with other fibers, such as greige or colored staple fibers from source 18. The blending station 17 may include any conventional blending equipment for moving the fibers together so that they are relatively uniformly dispersed. Any proportioning of the first fiber 16 and the greige or colored staple fibers 18 may be provided and controlled by the speed of practice of the steps 11 through 15, and/or the speed of conveyance of the fibers 18, or by putting in suitable flow control devices. For example about 20–60% first individual fibers from line 16 may be blended with about 80–40% greige or colored staple fibers from source 18, or the like.

After the fibers are blended in the desired proportions, as indicated at 17 in FIG. 1, a composite of fibers is produced as indicated at line 19 in FIG. 1. The composite fibers are then made into a final colored yarn, such as by spinning (e.g. such as ring spinning, open end spinning, or other conventional techniques) as illustrated schematically at 20 in FIG. 1.

In addition to the greige or colored staple fibers from source 18, or in place of them, other fibers may be blended at station 17 to produce a desired final yarn. For example as also schematically illustrated in FIG. 1 a second coarse feeder yarn may be produced as indicated at 21, slasher dyed as indicated at 22, dried as indicated at 23, and cut and opened up as indicated at 24, with the second individual fibers then fed in line 25 to the blending station 17. Again the various yarns may be proportioned by utilizing speed controls for the processes, flow control devices, or the like.

Utilizing the method as illustrated schematically in FIG. 1, an entire line of colored yarns may be produced, the yarns within a line each having the same basic compositional blend (e.g. about 70% cotton, 30% rayon) but having different colors. That is, the same type of method steps as illustrated in FIG. 1 may be utilized to produce at least third through fifth differently colored individual yarns and blending two or more of these at least first through fifth differently colored individual yarns together (at 17) to produce at least six differently colored final colored yarns in a product line of yarn, typically with ten or more colors in a line. For example the method may be utilized to produce yarns from the three primary colored fibers, which are then blended together in various proportions to produce any final colored yarn.

Figure 2:
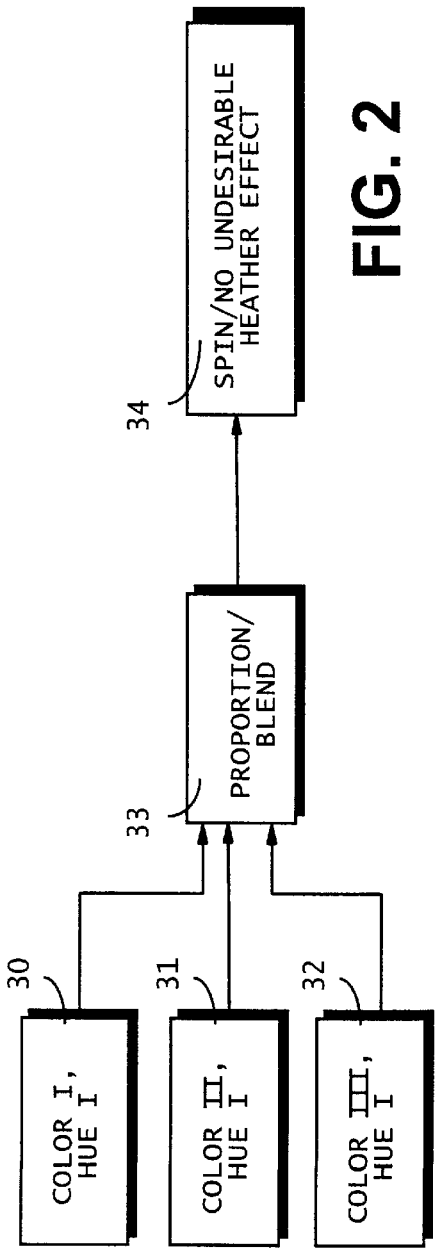
FIG. 2 is a box diagram indicating the use of at least three similar hue different color yarns produced according to FIG. 1 to produce a final yarn with minimal undesirable heather effect.
Figure 4:
FIG. 4 is a photograph showing an exemplary (greatly enlarged) yarn with a minimal or no undesired heather effect according to the invention.

The method according to the present invention may be used to produce final yarns with minimal undesirable heather effects, such as seen in FIG. 4. For example, as illustrated in FIG. 2, the method steps as illustrated in FIG. 1 may be used to produce at least three sets of fibers having similar hue, but different colors, as illustrated at 30–32 in FIG. 2. These can be what are known as "secondary colors" e.g. oranges, tans, greens, beiges, etc. An appropriate proportion of the yarns 30 through 32 are blended at 33 (with or without the addition of greige staple fibers or other colors with the same or similar basic hue), and then the blend is spun into the final yarn at 34, producing a final yarn with minimal undesirable heather effect.

Figure 3:
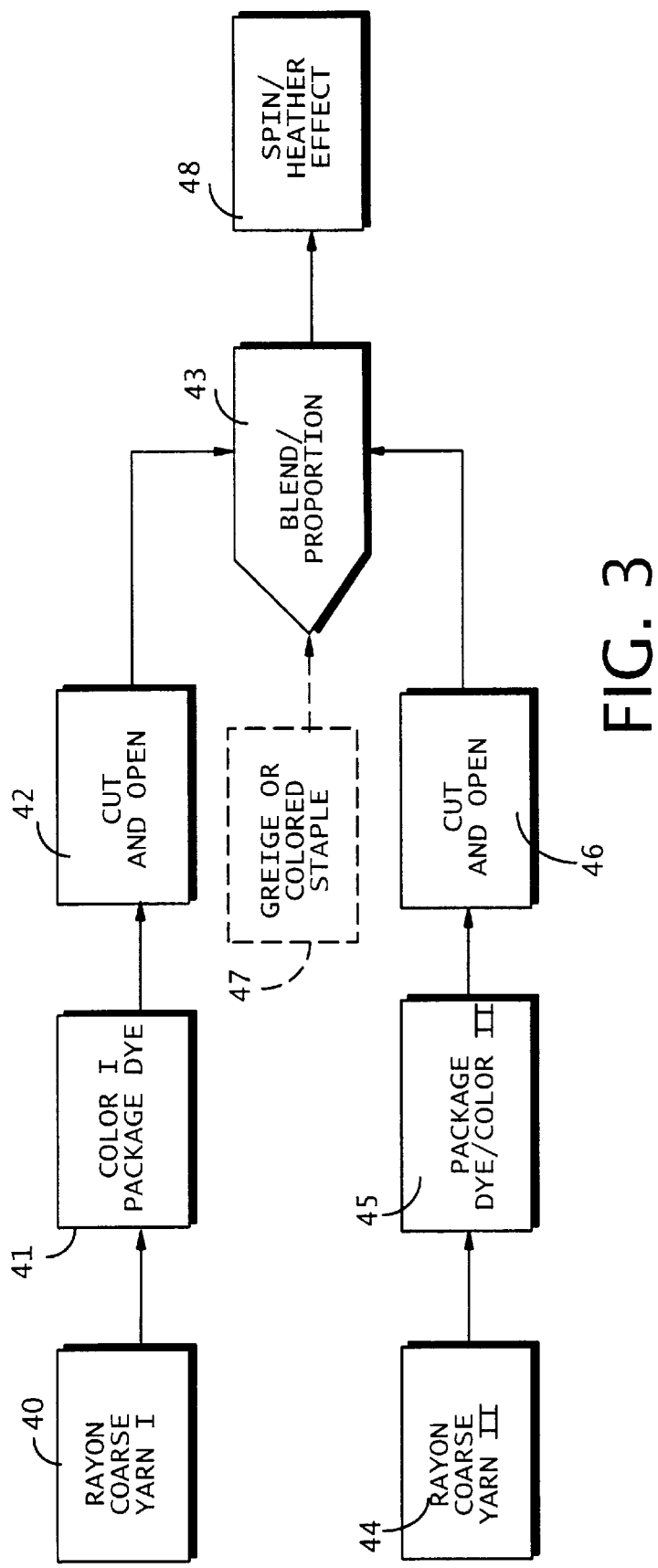
FIG. 3 is a box diagram indicating an exemplary method according to the present invention for producing a final rayon yarn with a distinct desired heather effect.
Figure 5:
FIG. 5 is a photograph showing an exemplary (greatly enlarged) yarn with a maximum desired heather effect.

FIG. 3 schematically illustrates method steps that may be utilized in the production of a rayon yarn which does have a distinct and desired heather effect. A first coarse yarn is produced at 40, package dyed to a first color at 41, cut and opened at 42, and blended at 43 with second individual fibers produced by spinning a second coarse yarn at 44, package dyeing it to a second color at 45, cutting and opening it at 46, and adding it to the blending stage at 43. Greige or colored staple fibers, indicated in dotted line at 47, may also be added. The properly proportioned composite blend from step 43 is then spun (e.g. ring or open end spun) into the final yarn at 48, producing a final rayon yarn with a distinctive and desired heather effect (see FIG. 5).

It will thus be seen that according to the present invention a simple and inexpensive method is provided for producing an entire line of different color yarns with the same basic composition, one that does not require stock dyed staple fibers or producer dyed fibers. The final colored yarns produced may be blended in such a way that there are only minimal undesirable heather effects, but when a heather effect is desired, it may be provided.

While the invention has been herein shown and described in what is presently conceived to be the most practical and preferred embodiment thereof, it will be apparent to those of ordinary skill in the art that many modifications may be thereof within the scope of the invention, which scope is to be accorded the broadest interpretation of the appended claims so as to encompass all equivalent methods and products.

What is claimed is:

1. A method of making a colored yarn, comprising the steps of substantially sequentially:
   (a) producing a virgin first coarse feeder yarn;
   (b) dyeing the first coarse feeder yarn a first color;
   (c) drying the dyed first coarse feeder yarn;
   (d) cutting the virgin dried first coarse feeder yarn and opening it up into first individual fibers about four inches long or less;
   (e) blending the individual fibers from step (d) with other fibers to produce a blended composite of fibers; and
   (f) spinning the composite of fibers into a final colored yarn.

2. A method as recited in claim 1 wherein step (a) is practiced by spinning a 0.5/1 cc to 4/1 cc yarn as the first coarse feeder yarn.

3. A method as recited in claim 2 wherein step (a) is practiced by ring spinning the yarn to have between about 1.0 to about 6.0 turns per inch.

4. A method as recited in claim 3 comprising the further step, between steps (a) and (b), of winding the first coarse feeder yarn on dye springs; and wherein step c) is practiced by package dyeing.

5. A method as recited in claim 4 wherein step (d) is practiced by cutting the dried feeder yarn into individual fibers about two inches long or less.

6. A method as recited in claim 5 wherein step (a) is practiced using at least some rayon fibers.

7. A method as recited in claim 1 wherein step (a) is practiced using staple yarns having a length of about three inches or more.

8. A method as recited in claim 1 wherein step (e) is practiced using at least some greige or colored staple fibers.

9. A method as recited in claim 8 wherein step (e) is practiced by blending between about 10% to about 80% first individual fibers with greige or colored staple fibers.

10. A method as recited in claim 1 comprising the further steps of (a1) producing a virgin second coarse feeder yarn; (b1) dyeing the second coarse feeder yarn a second color; (c1) drying the dyed second coarse feeder yarn; and (d1) cutting the virgin dried second coarse feeder yarn and opening it up into second individual fibers about four inches long or less; and wherein step (e) is practiced by blending said first and second, differently colored, individual fibers together.

11. A method as recited in claim 10 wherein steps (a1)–(d1) are practiced to produce at least third through fifth differently colored individual fibers, colored differently than each other and than the first and second fibers; and wherein step (e) is practiced by blending two or more of the at least first through fifth differently colored individual fibers together to produce at least six differently colored final colored yarns in a line or group of yarns.

12. A line or group of at least six different colored yarns each produced by practicing the method of claim 11.

13. A method as recited in claim 10 wherein steps (a)–(d) and (a1)–(d1) are practiced to produce individual fibers having different colors but similar hues; and wherein steps (a1)–(d1) are practiced to produce at least third individual fibers having a different color but similar hue to the first and second individual fibers; and wherein steps (e) and (f) are practiced to blend and spin the different color, similar hue, individual fibers together to produce a final yarn with no undesirable heather effect.

14. A line or group of at least six different colored yarns each produced by practicing the method of claim 13.

15. A method as recited in claim 10 wherein at least the majority of the staple fibers used in the practice of step (a) are rayon; and wherein steps (e) and (f) are practiced to produce a final yarn with a distinct and desired heather effect.

16. A line or group of at least six different colored yarns each produced by practicing the method of claim 15.

17. A method as recited in claim 10 wherein steps (e) and (f) are practiced also using some greige or colored staple fibers.

18. A method as recited in claim 17 wherein step (d) is practiced by cutting the dried feeder yarn into individual fibers about two inches long or less.

19. A method as recited in claim 1 wherein step (a) is practiced by using a mix of two or more different staple fibers selected from the group consisting essentially of cotton, rayon, polyester, acrylic, nylon, and polypropylene.

20. A method as recited in claim 1 wherein step (a) is practiced by ring spinning approximately a 1/1 cc yarn having only as many turns per inch as is necessary to make the yarn windable on dye springs as the first coarse feeder yarn, and wherein step (d) is practiced by cutting the dried feeder yarn into individual fibers about two inches long or less.

21. A method of making a line or group of yarns with at least six different colors comprising the steps of:
   (a) producing at least first, second, and third coarse feeder yarns;
   (b) dying the first, second, and third coarse feeder yarns respectively red, blue, and yellow;
   (c) drying the first, second, and third coarse feeder yarns;
   (d) cutting the dried first, second, and third coarse feeder yarns and opening them up into individual fibers about four inches long or less;
   (e) blending the first, second, and third opened and cut coarse feeder yarns with each other, and with greige or colored staple fibers, to produce at least six blended composites of fibers, each blended composite being a different color than the other blended composites; and
   (f) spinning the blended composites of fibers Into at least six final colored yarns in a line or group.

22. A method as recited in claim 21 wherein step (e) is practiced to produce at least one blended composite of fibers by blending first, second, or third coarse feeder yarns with greige staple fibers, and step (f) is practiced to spin the blend of at least one of the first, second and third coarse feeder lines with greige fibers into a final colored yarn.

* * * * *